United States Patent
Kwon et al.

(10) Patent No.: US 11,772,199 B2
(45) Date of Patent: Oct. 3, 2023

(54) GRAIN-ORIENTED ELECTRICAL STEEL SHEET AND MAGNETIC DOMAIN REFINEMENT METHOD THEREFOR

(71) Applicant: POSCO, Pohang-si (KR)

(72) Inventors: Oh-Yeoul Kwon, Pohang-si (KR);
Se-Min Park, Pohang-si (KR);
Jong-Tae Park, Pohang-si (KR);
Won-Gul Lee, Pohang-si (KR)

(73) Assignee: POSCO, Pohang-si (KR)

( * ) Notice: Subject to any disclaimer, the term of this patent is extended or adjusted under 35 U.S.C. 154(b) by 0 days.

(21) Appl. No.: 17/705,987

(22) Filed: Mar. 28, 2022

(65) Prior Publication Data

US 2022/0212289 A1 Jul. 7, 2022

Related U.S. Application Data

(62) Division of application No. 16/472,552, filed as application No. PCT/KR2017/015127 on Dec. 20, 2017, now Pat. No. 11,318,562.

(30) Foreign Application Priority Data

Dec. 22, 2016 (KR) .......................... 10-2016-0177011

(51) Int. Cl.
| | | |
|---|---|---|
| *B23K 26/364* | (2014.01) | |
| *B23K 26/16* | (2006.01) | |
| *C21D 1/18* | (2006.01) | |
| *C21D 3/04* | (2006.01) | |
| *C21D 9/46* | (2006.01) | |
| *C21D 8/12* | (2006.01) | |

(52) U.S. Cl.
CPC ............ *B23K 26/364* (2015.10); *B23K 26/16* (2013.01); *C21D 1/18* (2013.01); *C21D 3/04* (2013.01); *C21D 9/46* (2013.01); *C21D 8/1283* (2013.01); *C21D 8/1294* (2013.01); *C22C 2204/00* (2013.01)

(58) Field of Classification Search
None
See application file for complete search history.

(56) References Cited

U.S. PATENT DOCUMENTS

| | | |
|---|---|---|
| 2014/0374137 A1 | 12/2014 | Kwon |
| 2016/0177413 A1 | 6/2016 | Kwon |
| 2018/0043474 A1 | 2/2018 | Tamamura et al. |

(Continued)

FOREIGN PATENT DOCUMENTS

| | | |
|---|---|---|
| CN | 101979676 A | 2/2011 |
| CN | 104726671 A | 6/2015 |
| CN | 105451902 A | 3/2016 |

(Continued)

OTHER PUBLICATIONS

International Search Report and Written Opinion issued in International Patent Application No. PCT/KR2017/015127 dated Apr. 3, 2018, with English translation of Search Report.

(Continued)

*Primary Examiner* — Anthony M Liang
(74) *Attorney, Agent, or Firm* — Morgan, Lewis & Bockius LLP

(57) ABSTRACT

A grain-oriented electrical steel sheet incudes a groove formed on a surface and a solidified alloy layer formed under the groove, wherein the solidified alloy layer includes particles of a certain average diameter.

8 Claims, 4 Drawing Sheets

(56) References Cited

U.S. PATENT DOCUMENTS

2018/0066334 A1    3/2018    Mogi et al.

FOREIGN PATENT DOCUMENTS

| | | |
|---|---|---|
| CN | 107406936 A | 11/2017 |
| EP | 3025797 A1 | 6/2016 |
| JP | H09-49024 A | 2/1997 |
| JP | 2002-292484 A | 10/2002 |
| JP | 2005-059014 A | 3/2005 |
| JP | 2007-002334 A | 1/2007 |
| JP | 2009-049024 A | 3/2009 |
| JP | 5888525 B2 | 2/2016 |
| JP | 2016-532776 A | 10/2016 |
| KR | 10-0372058 B1 | 2/2003 |
| KR | 10-0523770 B1 | 10/2005 |
| KR | 10-2008-0066744 A | 7/2008 |
| KR | 10-0973391 B1 | 7/2010 |
| KR | 10-1066584 B1 | 9/2011 |
| KR | 10-1203286 B1 | 11/2012 |
| KR | 10-1234452 B1 | 2/2013 |
| KR | 10-1303472 B1 | 9/2013 |
| KR | 10-1389647 B1 | 4/2014 |
| KR | 10-2014-0087126 A | 7/2014 |
| KR | 10-2015-0012205 A | 2/2015 |
| KR | 10-2016-0019919 A | 2/2016 |
| KR | 10-2016-0078242 A | 7/2016 |
| KR | 10-2016-0078247 A | 7/2016 |
| WO | 2015/012562 A1 | 1/2015 |
| WO | 2016/171117 A1 | 10/2016 |
| WO | 2016/171124 A1 | 10/2016 |
| WO | 2016/171130 A1 | 10/2016 |

OTHER PUBLICATIONS

U.S. Notice of Allowance dated Jan. 4, 2022 issued in U.S. Appl. No. 16/472,552.
U.S. Final Office Action dated Apr. 13, 2021 issued in U.S. Appl. No. 16/472,552.
Indian Office Action dated Nov. 30, 2020 issued in Indian Patent Application No. 201947028969 (with English translation).
European Office Action dated Dec. 7, 2020 issued in European Patent Application No. 17883118.6.
U.S. Non-Final Office Action dated Dec. 8, 2020 issued in U.S. Appl. No. 16/472,552.
Chinese Office Action dated Jul. 1, 2020 issued in Chinese Patent Application No. 201780079232.2.
Japanese Office Action dated Jul. 21, 2020 issued in Japanese Patent Application No. 2019-534649.
Extended European Search Report dated Oct. 29, 2019 issued in European Patent Application No. 17883118.6.

GRAIN-ORIENTED ELECTRICAL STEEL SHEET AND MAGNETIC DOMAIN REFINEMENT METHOD THEREFOR

CROSS-REFERENCE OF RELATED APPLICATIONS

This application is a Divisional patent application of U.S. patent application Ser. No. 16/472,552, filed on Jun. 21, 2019, which is the U.S. National Phase under 35 U.S.C. § 371 of International Application No. PCT/KR2017/015127 filed on Dec. 20, 2017, which claims the benefit of Korean Application No. 10-2016-0177011 filed on Dec. 22, 2016, the entire contents of each are hereby incorporated by reference.

TECHNICAL FIELD

A grain-oriented electrical steel sheet and a method for refining magnetic domains therein are related.

BACKGROUND ART

Since a grain-oriented electrical steel sheet is used as an iron core material of an electrical device such as a transformer, in order to improve energy conversion efficiency thereof by reducing power loss of the device, it is necessary to provide a steel sheet having excellent iron loss of the iron core material and a high occupying ratio when being stacked and spiral-wound.

The grain-oriented electrical steel sheet refers to a functional material having a texture (referred to as a "GOSS texture") of which a secondary-recrystallized grain is oriented with an azimuth {110}<001> in a rolling direction through a hot rolling process, a cold rolling process, and an annealing process.

A permanent magnetic domain refining method which shows the improvement of the iron loss even after a stress relaxation heat treatment above a heat treatment temperature where recovery occurs may be divided into an etching method, a roll method, and a laser method. Since it is difficult to control a groove shape because the grooves are formed on the surface of the steel sheet by a selective electrochemical reaction in a solution, it is difficult to uniformly secure the iron loss characteristics of the final product in the width direction. In addition, an acid solution used as a solvent has a disadvantage that it is not environmentally friendly.

The method of refining the permanent magnetic domain by the roll is a technology of magnetic domain miniaturization partially generating recrystallized particles under the groove by forming and then annealing a groove having a constant width and depth on the surface of the plate by processing a protrusion shape on the roll to be pressed by the roll or the plate. The roll method is disadvantageous in stability in machine processing, reliability to obtain stable iron loss depending on the thickness, and process complexity, and deterioration of the iron loss and the magnetic flux density characteristics immediately after the groove formation (before the stress relaxation annealing).

As the method of refining the permanent magnetic domain by a laser of a pulse and non-Gaussian mode forms a solidified alloy layer of the groove part only at the side wall or does not uniformly form the groove on the entire surface of the groove when forming the groove, because of causing excessive deformation at the bottom part of the groove, it is difficult to apply to the process before the primary recrystallization process or after the primary recrystallization process and it has a drawback that it shows a deteriorated occupying ratio after a final insulation coating. The grooving method by a continuous wave laser may form the solidified alloy layer entirely or partially, however it has a drawback that it is difficult to control the recrystallized particles' grain size in the heat treatment condition above the stress relaxation annealing through the thickness control of the solidified alloy layer.

DISCLOSURE

Technical Problem

A grain-oriented electrical steel sheet having an iron loss improvement and a low magnetic flux density degradation rate characteristic after a heat treatment and a method for refining a magnetic domain therein are provided.

Technical Solution

A grain-oriented electrical steel sheet according to an exemplary embodiment of the present invention includes: a groove formed on a surface; and a solidified alloy layer formed under the groove, wherein the solidified alloy layer includes recrystallized particles of which an average particle diameter is from 1 to 10 μm.

A grain-oriented electrical steel sheet according to another exemplary embodiment of the present invention includes: a groove formed on a surface; and a solidified alloy layer formed under the groove, wherein the solidified alloy layer includes recrystallized particles of which an average particle diameter is from 1 to 20 μm after stress relaxation annealing.

A thickness of the solidified alloy layer may be 0.6 to 3.0 μm.

A non-metallic oxide layer formed on the surface of the electrical steel sheet may be further included.

The non-metallic oxide layer may include $Mg_2SiO_4$, $Al_2SiO_4$, or $Mn_2SiO_4$.

An insulating coating layer formed on the non-metallic oxide layer may be further included.

The groove may be linear and may be formed with an angle of 82° to 98° with respect to a rolling direction of the electrical steel sheet.

A depth D of the groove may be from 3% to 8% of the thickness of the electrical steel sheet.

A magnetic domain refining method of a grain-oriented electrical steel sheet according to an exemplary embodiment of the present invention includes: preparing a grain-oriented electrical steel sheet; irradiating a laser to a surface of the grain-oriented electrical steel sheet to form a groove; and quenching a portion where the groove is formed with a cooling speed of 400 to 1500° C./s.

The quenching may be simultaneous quenching with the groove formation.

Stress relaxation annealing after the quenching may be further included.

In the groove forming, the laser may be a continuous wave laser having a Gaussian energy distribution and an output of 1 kW or more.

The laser may be a continuous wave laser that is a $TEM_{00}$ mode and has a beam quality factor $M^2$ of 1.0 to 1.1 and an output of 1 to 10 kW.

Removing a hill-up or a spatter formed on the electrical steel sheet surface after forming the groove may be further included.

Preparing the grain-oriented electrical steel sheet may include: forming an oxide layer on the surface of the steel sheet by decarburization-annealing or nitriding-annealing the cold-rolled steel sheet; and forming a non-metallic oxide layer on the surface of the steel plate by coating an annealing separator on the surface of the steel plate on which the oxidation layer is formed.

After forming the non-metallic oxide layer, forming an insulating coating layer on the non-metallic oxide layer may be further included.

Advantageous Effects

According to one embodiment of the present invention, the magnetic flux density degradation due to permanent magnetic domain refining may be reduced and the iron loss improvement rate may be increased.

Also, according to one embodiment of the present invention, it may be used as a stacked iron core transformer and a wound iron core transformer iron core requiring a heat treatment after the final insulation coating.

MODE FOR INVENTION

The terms "first", "second", and "third" are used herein to explain various parts, components, regions, layers, and/or sections, but it should be understood that they are not limited thereto. These terms are used only to discriminate one portion, component, region, layer, or section from another portion, component, region, layer, or section. Thus, a first portion, component, region, layer, or section may be referred to as a second portion, component, region, layer, or section without departing from the scope of the present invention. The technical terms used herein are to simply mention a particular embodiment and are not meant to limit the present invention. An expression used in the singular encompasses the expression of the plural, unless it has a clearly different meaning in the context. The term 'including' used herein embodies concrete specific characteristics, regions, positive numbers, steps, operations, elements, and/or components, without limiting existence or addition of other specific characteristics, regions, positive numbers, steps, operations, elements, and/or components.

It will be understood that when an element such as a layer, film, region, or substrate is referred to as being "on" or "above" another element, it can be directly on or above the other element or intervening elements may also be present. In contrast, when an element is referred to as being "directly on" another element, there are no intervening elements therebetween.

If not defined differently, all the terminologies including technical terminologies and scientific terminologies used herein have meanings that are the same as ones that those skilled in the art generally understand. The terms defined in dictionaries should be construed as having meanings corresponding to the related prior art documents and those stated herein, and are not to be construed as being ideal or official, if not so defined.

Hereinafter, exemplary embodiments of the present invention will be described in detail so as to be easily practiced by a person skilled in the art to which the present invention pertains. As those skilled in the art would realize, the described embodiments may be modified in various different ways, all without departing from the spirit or scope of the present invention.

Figure 1:
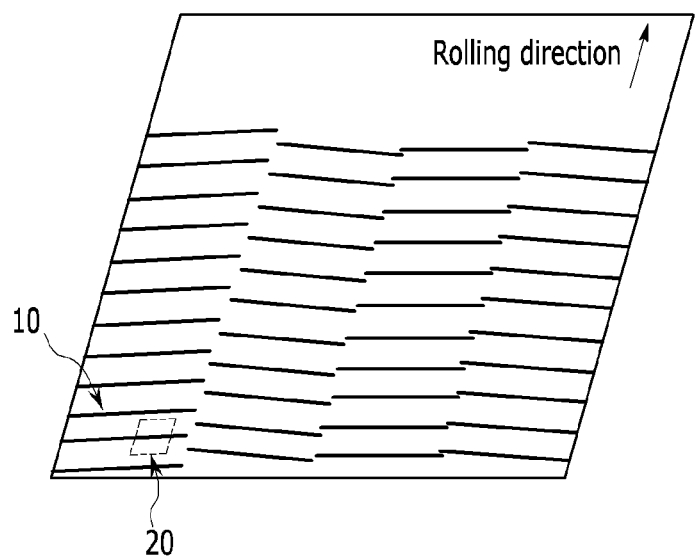
FIG. 1 is a schematic view of a grain-oriented electrical steel sheet according to an exemplary embodiment of the present invention.

FIG. 1 shows a schematic view of a grain-oriented electrical steel sheet 10 according to an exemplary embodiment of the present invention. As shown in FIG. 1, a plurality of grooves 20 are formed along a rolling direction on the surface of the grain-oriented electrical steel sheet 10.

Figure 2:
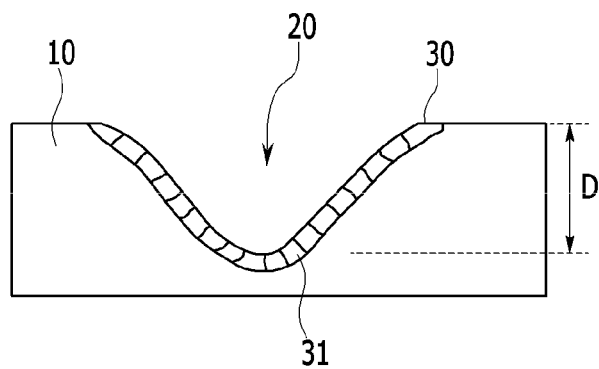
FIG. 2 is a cross-sectional schematic view of a grain-oriented electrical steel sheet according to an exemplary embodiment of the present invention.

FIG. 2 shows a cross-sectional schematic view of a grain-oriented electrical steel sheet 10 according to an exemplary embodiment of the present invention. As shown in FIG. 2, the grain-oriented electrical steel sheet 10 according to an exemplary embodiment of the present invention includes the groove 20 formed on the surface and a solidified alloy layer 30 formed under the groove 20, and the solidified alloy layer 30 includes recrystallized particles 31 having an average particle diameter of 1 to 10 μm. In an exemplary embodiment of the present invention, by controlling the size of the recrystallized particles 31 in the solidified alloy layer 30, although a heat treatment above a recrystallization temperature such as a stress relaxation annealing is applied, an improvement effect of the iron loss may be obtained even after stress relaxation annealing as a recrystallized grain is grown in the solidified alloy layer 30 and into the base. The average particle diameter of the recrystallized particles 31 may be 1 to 10 μm. If the average particle diameter of the recrystallized particles 31 is too small, the magnetic flux density degradation rate is increased due to the increase in the semi-magnetic field. If the average particle diameter of the recrystallized particles 31 is too large, due to the reduction of the semi-magnetic field, the iron loss improvement rate is decreased and the magnetic flux density degradation rate is increased. More specifically, the average particle diameter of the recrystallized particles 31 may be in a range of 2 to 7 μm.

Figure 3:
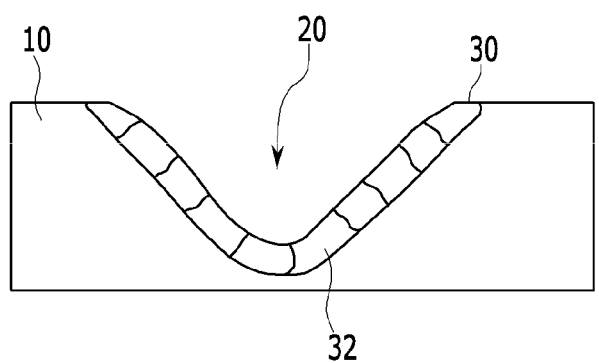
FIG. 3 is a cross-sectional schematic view of a grain-oriented electrical steel sheet according to another exemplary embodiment of the present invention.

FIG. 3 shows a cross-section of the grain-oriented electrical steel sheet 10 according to another exemplary embodiment of the present invention. When the grain-oriented electrical steel sheet 10 in FIG. 2 described above is heat-treated above the recrystallization temperature such as in the stress relaxation annealing, the recrystallized grain is grown in the inner part of the solidified alloy layer 30, and the base portion and recrystallized particles 32 are formed after the stress relaxation annealing. The recrystallized particles 32 formed after the stress relaxation annealing may have an average particle diameter of 1 to 20 μm.

The solidified alloy layer 30 is formed during laser irradiation for refining the magnetic domain. The thickness of the solidified alloy layer 30 may be between 0.6 and 3.0 μm. When the thickness of the solidified alloy layer 30 is very thin, since the recrystallized particles 31 in the solidified alloy layer 30 are not grown to the base portion in which the secondary recrystallization occurs, the iron loss improvement effect by the recrystallized particles 31 does not occur, and when the thickness of solidified alloy layer 30 is too thick, the recrystallized particles 32 are formed, but the recrystallized particles 32 after stress relaxation annealing are also formed at the lower portion, the side portion, and the base portion by a heat effect, and accordingly the magnetic flux density deterioration may become remarkable.

Figure 4:
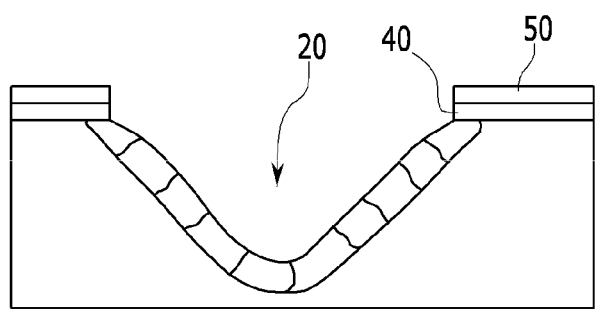
FIG. 4 is a cross-sectional schematic view of a grain-oriented electrical steel sheet according to another exemplary embodiment of the present invention.

As shown in FIG. 4, a non-metallic oxide layer 40 may be formed on the surface of the steel plate 10. When the non-metallic oxide layer 40 is formed, a laser absorption rate is increased by 30% or more compared to that of the steel plate in which the non-metallic oxide layer 40 is not formed when irradiating the laser, so the grooves 20 may be formed with relatively low energy density, and the linear grooves 20 may be formed with a high irradiation speed.

Accordingly, a laser output required for forming the groove 20 is reduced by 20% or more for the steel plate on which the non-metallic oxide layer 40 is formed compared with the steel plate on which the non-metallic oxide layer 40 is not formed, thereby increasing the efficiency in improving the iron loss.

In addition, when the non-metallic oxide layer 40 is formed on the surface of the steel plate, the non-metallic oxide layer is physically and chemically solid-bonded to the steel plate surface and is not easily damaged by thermal impact by laser irradiation.

Preferably, the non-metallic oxide layer 40 is formed on the surface of the steel plate with a thickness of 1 to 20 μm. If the thickness of the non-metallic oxide layer 40 is too thin, the effect of increasing the laser absorption rate is low and the non-metallic oxide layer may be destroyed by the thermal impact during the laser irradiation, and if the thickness of the non-metallic oxide layer 40 is too thick, there is drawback that it is difficult to control the process conditions for forming the non-metallic oxide layer 40 and the laser output for forming the groove 20 is increased.

The non-metallic oxide layer 40 may comprise $Mg_2SiO_4$, $Al_2SiO_4$, or $Mn_2SiO_4$.

An insulating coating layer 50 may be formed on the non-metallic oxide layer 40.

The depth D of groove 20 may be 3% to 8% of the thickness of the electrical steel sheet. More specifically, it may be 4% to 8%. If it is less than 3%, the groove of an appropriate depth for improving the iron loss is not formed. If it exceeds 8%, a heat affected part may increase and the growth of the Goss texture may have an adverse effect.

In addition, the groove 20 may be formed at 82° to 98° with respect to the rolling direction of the electrical steel sheet. By forming the groove 20 in an oblique shape not including 90 degrees, the semi-magnetic field may be weakened, thereby improving the magnetism.

The grooves 20 may be formed intermittently from 2 to 10 pieces in the width direction of the steel plate.

The magnetic domain refining method of the grain-oriented electrical steel sheet according to an exemplary embodiment of the present invention includes: preparing the grain-oriented electrical steel sheet; irradiating a laser to the surface of the grain-oriented electrical steel sheet to form the groove; and quenching the part where the groove is formed at a cooling speed of 400 to 1500° C./s. Hereinafter, each step is described in detail.

First, the grain-oriented electrical steel sheet is prepared.

The preparation of the grain-oriented electrical steel sheet may include: decarbonizing or nitriding a cold-rolled electrical steel sheet to form an oxidation layer on the surface of the steel plate; and coating an annealing separator on the surface of the steel plate on which the oxidation layer is formed and annealing at a high temperature to form a non-metallic oxide layer on the surface of the steel plate.

Generally, the cold-rolled steel sheet may be produced by subjecting a slab containing 1 to 7% by weight of Si to hot rolling, hot-rolled sheet annealing, and cold rolling. Since the non-metallic oxide layer is the same as described above, repeated description is omitted.

In an exemplary embodiment of the present invention, the magnetic domain refining may be performed directly on the surface of the steel plate, or the non-metallic oxide may be formed on the surface of the steel plate, magnetic domain refining and then the laser may be irradiated to perform the magnetic domain refining, and an insulating coating layer may be additionally formed on the surface of the steel plate by coating and heat-treating an insulating coating liquid including colloidal silica and a metal phosphate on the non-metallic oxide layer and then the laser may be irradiated to perform the magnetic domain refining. If the non-metallic oxide layer is formed on the surface of the steel plate, this layer may increase the laser absorption rate and form the groove with relatively low energy density.

Next, the surface of the grain-oriented electrical steel sheet is irradiated with the laser to form the groove.

At this time, the laser may be a continuous wave laser having a Gaussian energy distribution and an output of 1 kW or more. This continuous wave laser is suitable for forming the uniform groove on the electrical steel sheet surface after the secondary recrystallization is completed. More specifically, the laser is a $TEM_{00}$ mode, and may be a continuous wave laser of which a beam quality factor M2 is 1.0 to 1.1 and the output is 1 to 10 kW. Since forming grooves with a gasify only by the laser irradiation does not form the solidified alloy layer, the method of forming the groove using the laser with too high an output is not preferable.

A step of removing a hill-up or a spatter formed on the electrical steel sheet surface after the step of forming the groove may be further included. The hill-up means that a fusion material generated during the groove formation has risen to the both tops of the groove, and the spatter is formed by scattering of the fusion material. The hill-up and the spatter may be removed by brushing or pickling.

Next, the portion where the groove is formed is quenched at a cooling speed of 400 to 1500° C./s. In an exemplary embodiment of the present invention, the size of the recrystallized particles in the solidified alloy layer may be controlled by controlling the cooling speed. Specifically, the average particle diameter of the recrystallized particles in the solidified alloy layer may be controlled from 1 to 10 μm by controlling the cooling speed from 400 to 1500° C./s. More specifically, the cooling speed may be adjusted from 500 to 1200° C./s.

The quenching method is not particularly limited, and an air cooling method above the laser irradiation may be used. The quenching steps may be done simultaneously with the groove formation.

After the quenching, the stress relaxation annealing may be further included. In case of the heat treatment above the recrystallization temperature such as the stress relaxation annealing in an exemplary embodiment of the present invention, the recrystallized grain grows in the solidified alloy layer and to the base portion such that recrystallized particles are formed after the stress relaxation annealing. The recrystallized particles after the stress relaxation annealing may have the average particle diameter of 1 to 20 μm.

In this heat treatment condition above the recrystallization temperature after the formation of the solidified alloy layer, the recrystallized particle formation after the stress relaxation annealing may achieve an improvement effect of the iron loss of 2% or more and simultaneously a magnetic flux density degradation rate of 1.0% or less.

Hereinafter, the present invention is described in more detail through an example. However, this example is merely to illustrate the present invention, and the present invention is not limited thereto.

Example

The grain-oriented electrical steel sheet of the cold-rolled thickness of 0.30 mm is decarburization-annealed to form the oxidation layer, the annealing separator including MgO is coated, and the high temperature annealing is performed to form a forsterite film. Thereafter, the insulating coating liquid containing the colloidal silica and the metal phosphate is coated to form the insulating coating layer.

That laser that is a $TEM_{00}$ mode and has the beam quality factor of $M^2$ of 1.0 is irradiated to the electrical steel sheet surface by controlling the output to 1.8 kW. In a case of Comparative Example 2 of Table 2, a pulse laser that is not a continuous wave laser is used. During the laser irradiation, the cooling speed is adjusted as shown in the following table through the air cooling. After the magnetic domain refinement treatment, the stress annealing is performed.

The groove depth, the solidified alloy layer thickness, the average particle diameter of the recrystallized particles in the solidified alloy layer, and the recrystallized particle average particle diameter of the stress annealing are summarized in Table 1 and Table 2.

TABLE 1

| | Groove depth (μm) | Solidified alloy layer thickness (μm) | Recrystallized particles average particle diameter (μm) | Recrystallized particles average particle diameter after stress annealing (μm) | Before laser irradiation | After laser irradiation | After heat treatment stress annealing | Iron loss improvement rate (%) | Magnetic flux density degradation rate (%) |
|---|---|---|---|---|---|---|---|---|---|
| Example (continuous wave/ cooling speed 500° C./s) | 9 | 0.6 | 6 | 8 | 0.96/1.92 | 0.86/1.91 | 0.83/1.91 | 3.5 | 0.0 |
| | | | | 9 | 0.97/1.92 | 0.86/1.91 | 0.84/1.91 | 2.3 | 0.0 |
| | | 3.0 | 9 | 13 | 0.97/1.92 | 0.87/1.91 | 0.82/1.90 | 5.7 | −0.5 |
| | | | | 15 | 0.96/1.92 | 0.86/1.91 | 0.81/1.90 | 5.8 | −0.5 |
| | 18 | 0.6 | 5 | 9 | 0.96/1.92 | 0.85/1.91 | 0.81/1.90 | 2.4 | −0.5 |
| | | | | 10 | 0.96/1.92 | 0.86/1.91 | 0.82/1.91 | 2.3 | 0.0 |
| | | 3.0 | 7 | 14 | 0.97/1.92 | 0.85/1.90 | 0.82/1.89 | 3.5 | −0.5 |
| | | | | 16 | 0.96/1.92 | 0.87/1.91 | 0.83/1.90 | 4.6 | −0.5 |

TABLE 2

| | Groove depth (μm) | Solidified alloy layer thickness (μm) | Recrystallized particle average particle diameter (μm) | Recrystallized particle average particle diameter after stress annealing (μm) | Before laser irradiation | After laser irradiation $W_{17/50}/B_8$ | After stress annealing heat treatment | Iron loss improvement rate (%) | Magnetic flux density degradation rate (%) | Occupying ratio (%) |
|---|---|---|---|---|---|---|---|---|---|---|
| Example (continuous wave/ cooling speed. 500° C./s) | 15 | 3.0 | 7.0 | 11 | 0.97/1.92 | 0.85/1.90 | 0.82/1.90 | 3.5 | 0.0 | 97.2 |
| | | | | 12 | 0.97/1.92 | 0.85/1.90 | 0.82/1.90 | 2.4 | 0.0 | 97.1 |
| Example (continuous wave/ cooling speed. 1200° C./s) | 15 | 0.6 | 2.0 | 9 | 0.97/1.92 | 0.85/1.90 | 0.81/1.90 | 4.7 | 0.0 | 97.3 |
| | | | | 9 | 0.97/1.92 | 0.84/1.90 | 0.80/1.90 | 5.9 | 0.0 | 97.4 |
| Comparative Example 1 (continuous wave/ cooling speed. 300° C./s) | 15 | 3.5 | 8.7 | 21 | 0.97/1.92 | 0.93/1.89 | 0.93/1.87 | 0.0 | −1.05 | 95.1 |
| | | | | 22 | 0.96/1.92 | 0.92/1.89 | 0.92/1.87 | 0.0 | −1.05 | 95.2 |

TABLE 2-continued

| | Groove depth (μm) | Solidified alloy layer thickness (μm) | Recrystallized particle average particle diameter (μm) | Recrystallized particle average particle diameter after stress annealing (μm) | Before laser irradiation | After laser irradiation | After stress annealing heat treatment $W_{17/50}/B_8$ | Iron loss improvement rate (%) | Magnetic flux density degradation rate (%) | Occupying ratio (%) |
|---|---|---|---|---|---|---|---|---|---|---|
| Comparative Example 2 (Pulse Laser/ cooling speed 500° C./s) | 15 | 0.3 | No formation | — | 0.97/ 1.92 | 1.01/ 1.87 | 1.01/ 1.85 | 0.0 | −1.06 | 94.8 |
| | | | | — | 0.96/ 1.92 | 0.99/ 1.86 | 0.99/ 1.85 | 0.0 | −0.53 | 94.7 |

In Table 1 and Table 2, the iron loss improvement rate is calculated by $(W_1-W_2)/W_1$ by measuring the iron loss $W_1$ of the electrical steel sheet before the groove is formed by the laser irradiation and the iron loss $W_2$ after forming the groove by the laser irradiation. The magnetic flux density degradation rate is calculated by $(B_2-B_1)/B_1$ by measuring the magnetic flux density $B_1$ of the electrical steel sheet before the groove is formed by the laser irradiation and the magnetic flux density $B_2$ after forming the groove by the laser irradiation. The occupying ratio as a weight ratio of the steel plate corresponding to an actual volume for a theoretical volume under a 5 MPa pressure is measured by a method of JIS C 2550-2000.

As shown in Table 1 and Table 2, in an example in which the continuous wave laser is used and the cooling speed is appropriately adjusted, it may be confirmed that the recrystallized particles are formed with the appropriate size in the solidified alloy layer, the iron loss improvement rate and the magnetic flux density degradation rate are excellent, and the iron loss and the magnetic flux density are excellent even after the stress annealing heat treatment.

Although exemplary embodiments of the present invention were described with reference to the accompanying drawings, the present invention is not limited to the exemplary embodiments and may be modified in various ways. Further, it would be understood that the present invention may be implemented in other detailed ways by those skilled in the art without the scope and necessary components of the present invention being changed. Therefore, the embodiments described above are only examples and should not be construed as being limitative in all respects.

DESCRIPTION OF SYMBOLS

10: electrical steel sheet
20: groove
30: solidified alloy layer
31: recrystallized particles
32: recrystallized particles after stress annealing layer
40: non-metallic oxide
50: insulating coating layer

The invention claimed is:

1. A magnetic domain refining method of a grain-oriented electrical steel sheet, comprising:
   preparing a grain-oriented electrical steel sheet;
   irradiating a laser to a surface of the grain-oriented electrical steel sheet to form a groove; and
   quenching a portion where the groove is formed with a cooling speed of 400 to 1500° C./s.

2. The magnetic domain refining method of the grain-oriented electrical steel sheet of claim 1, wherein
   the quenching is simultaneous quenching with the groove formation.

3. The magnetic domain refining method of the grain-oriented electrical steel sheet of claim 1, further comprising, after the quenching,
   stress relaxation annealing.

4. The magnetic domain refining method of the grain-oriented electrical steel sheet of claim 1, wherein,
   in the forming of the groove,
   the laser is a continuous wave laser having a Gaussian energy distribution and an output of 1 kW or more.

5. The magnetic domain refining method of the grain-oriented electrical steel sheet of claim 4, wherein
   the laser is a continuous wave laser that is a $TEM_{00}$ mode and has a beam quality factor $M^2$ of 1.0 to 1.1 and output of 1 to 10 kW.

6. The magnetic domain refining method of the grain-oriented electrical steel sheet of claim 1, further comprising
   removing a hill-up or a spatter formed on the electrical steel sheet surface after forming the groove.

7. The magnetic domain refining method of the grain-oriented electrical steel sheet of claim 1, wherein
   the preparing the grain-oriented electrical steel sheet includes:
   forming an oxide layer on the surface of the steel sheet by decarburization-annealing or nitriding-annealing cold-rolled steel sheet; and
   forming a non-metallic oxide layer on the surface of the steel sheet by coating an annealing separator on the surface of the steel sheet on which the oxidation layer is formed.

8. The magnetic domain refining method of the grain-oriented electrical steel sheet of claim 7, further comprising, after forming the non-metallic oxide layer,
   forming an insulating coating layer on the non-metallic oxide layer.

* * * * *